United States Patent [19]

McCullough

[11] 4,436,495

[45] Mar. 13, 1984

[54] METHOD OF FABRICATING TWO-PIECE SCROLL MEMBERS FOR SCROLL APPARATUS AND RESULTING SCROLL MEMBERS

[75] Inventor: John E. McCullough, Carlisle, Mass.

[73] Assignee: Arthur D. Little, Inc., Cambridge, Mass.

[21] Appl. No.: 239,563

[22] Filed: Mar. 2, 1981

[51] Int. Cl.³ .................. F01C 1/02; F01C 21/08; B23P 11/00
[52] U.S. Cl. .................. 418/55; 29/156.4 R; 29/156.8 R; 29/522 R
[58] Field of Search .................. 418/55; 416/218, 222; 29/156.4 R, 156.8 R, 522 R

[56] References Cited

U.S. PATENT DOCUMENTS

| | | | |
|---|---|---|---|
| 1,345,678 | 7/1920 | Kasley | 416/218 |
| 1,470,499 | 10/1923 | Steenstrup | 29/156.8 R |
| 3,994,635 | 11/1976 | McCullough | 418/55 |

FOREIGN PATENT DOCUMENTS

| | | | |
|---|---|---|---|
| 375539 | 5/1923 | Fed. Rep. of Germany | 416/218 |
| 8905 | 5/1923 | Netherlands | 29/156.8 R |
| 27483 | of 1911 | United Kingdom | 416/218 |

*Primary Examiner*—John J. Vrablik
*Attorney, Agent, or Firm*—Richard J. Hammond

[57] ABSTRACT

A two-piece scroll member, for use in scroll apparatus, is fabricated by seating a separately formed involute wrap in an involute channel cut in the end plate. The channel has at least one reentrant groove and the surface of the wrap is configured to engage the groove. Locking means are coined into the groove to rigidly affix the wrap to the end plate.

15 Claims, 17 Drawing Figures

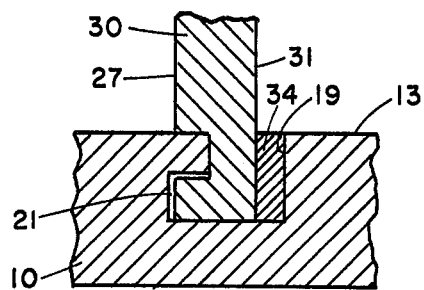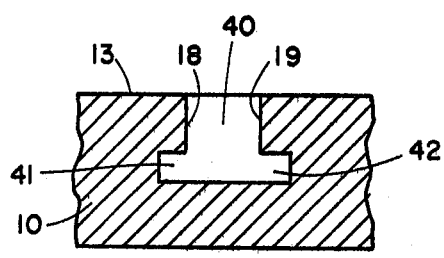
Fig. 10    Fig. 11
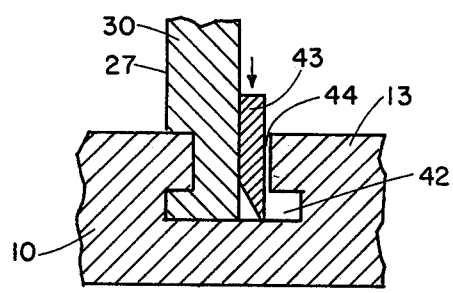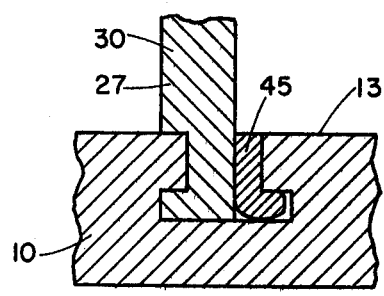
Fig. 12    Fig. 13
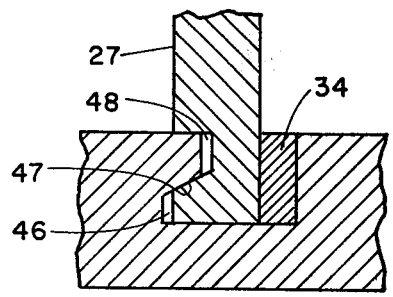
Fig. 14

METHOD OF FABRICATING TWO-PIECE SCROLL MEMBERS FOR SCROLL APPARATUS AND RESULTING SCROLL MEMBERS

This invention relates to scroll-type apparatus and more particularly to a two-piece construction of the scroll members used therein.

There is known in the art a class of devices generally referred to as "scroll" pumps, compressors and expanders wherein two interfitting spiroidal or involute spiral elements of like pitch are mounted on separate end plates. These spiral elements are angularly and radially offset to contact one another along at least one pair of line contacts such as between spiral curved surfaces. A pair of line contacts will lie approximately upon one radius drawn outwardly from the central region of the scrolls. The fluid volume so formed therefore extends all the way around the central region of the scrolls and comprises one or more fluid pockets, the angular position of which varies with relative orbiting of the spiral centers. All of these pockets maintain the same relative angular position; and as the contact lines shift along the scroll surfaces, the pockets experience a change in volume. The resulting zones of lowest and highest pressures are connected to fluid ports.

Important recent developments in scroll apparatus technology have essentially solved the problems connected with the attainment of effective sealing of the fluid pockets; and a number of novel driving means, coupling means, thrust bearing means, porting means, etc., suitable for scroll apparatus, have been disclosed. (See for example U.S. Pat. Nos. 3,874,827, 3,884,599, 3,924,977, 3,986,799, 3,994,663, 3,994,636, 4,065,279, 4,082,484, 4,121,438, 4,129,409, 4,160,629, 4,192,152 and 4,199,308.)

In constructing the scroll members, each of which comprises an end plate with the involute spiral wrap elements attached thereto, it has previously been the practice to form these members from a single piece of metal by machining out the involute spiral wraps. Although this is, of course, within the capabilities of present milling techniques it consumes a great deal of time and energy and produces large quantities of waste metal. Thus relying solely on milling techniques for scroll member fabrication makes it unduly expensive to make scroll members for scroll-like apparatus, a fact which for many applications does not permit scroll-type apparatus to compete in price with other types of compressors or expansion engines. Such added cost thus outweighs the operational advantages inherent in scroll-type machinery.

Radial sealing of the fluid pockets, i.e., sealing across the surface of the involute wraps to prevent leakage from a pocket of higher pressure to an adjacent pocket of lower pressure is preferably controlled through the use of axial compliance/sealing means such as detailed in U.S. Pat. Nos. 3,994,636 and 4,199,308 and in U.S. application Ser. No. 233,915, filed Feb. 12, 1981. The use of such sealing means eliminates the need for the lapping of the wrap and end plate contacting surfaces. However, effective sealing requires that along its entire length the involute wrap is joined at its base to the end plate to define a right angle or other suitable configuration to permit the required contact with the opposing end of the complementary scroll member when assembled in an operational scroll apparatus. Effective sealing also requires the accurate dimensioning and finishing of the wrap flanks and the end plate surface.

A suitable mass production technique for scroll components, i.e., scroll members, should involve minimum and preferably no machining; and it should provide components which meet the stringent requirements for dimensional accuracy and finishing associated with efficient scroll operation. There are two basic constructional alternatives for fabricating scroll members, namely, forming them from an integrally cast involute and end plate or forming the involute and end plate separately and joining them into a finished scroll member.

Precision die casting of one-piece scroll members followed by one or another finishing techniques eliminates the disadvantages of having to rely solely on milling of the involute wrap to attain the required dimensions and finish; and such methods of fabrication are described in my applications Ser. Nos. 239,564 and 239,414, filed concurrently herewith. The first of these methods comprises the coining or cold forming of a precision formed scroll member provided either as an integral element or as a separate end plate and involute wrap, to form the required dimensions and finish; and the second comprises the axial broaching of the involute walls and the machining of the end plate surfaces. There are, however, instances in which neither coining nor axial broaching of the involute walls is practical. Thus, for example, cast iron or stainless steel cannot be satisfactorily coined; nor is it always convenient to broach the walls of the involute wraps and machine the surfaces of the end plate around the wraps. Furthermore, it may be desirable in some cases to form the involute wraps and end plates of two different materials which may not be amenable to the same fabrication and finishing techniques.

In U.S. Pat. No. 3,994,365, there is disclosed an alternative to the machining of the wrap flanks and end plate surfaces around the base of the involute, therein. In this patent there is disclosed the construction of two-piece scroll members in which the involute wrap, seated in a channel in the end plate surface, is either free to experience small axial and radial excursions in the channel or is rigidly attached to the end plate.

Rigid attachment is attained through the use of a plurality of spaced screws, an arrangement which requires a relatively tight fit of the wrap in the channel as well as the precise alignment of a large number of threaded holes through the end plate with threaded holes in the involute surface. Since the two-piece construction of scroll members has, in some cases, distinct advantages, it would be desirable to have available a method for accurately and rigidly assembling a two-piece scroll member without the need for a large number of threaded holes and the need for the labor required to insert and tighten the screws required.

It is therefore a primary object of this invention to provide an improved method for fabricating scroll members for use in scroll apparatus. It is another object to provide a method of the character described which makes it possible to materially reduce the cost of the scroll members and to make scroll apparatus, with their inherent advantages, cost competitive with other types of compressors, expanders and pumps. It is a further object of this invention to provide a scroll member fabrication technique which makes it possible to assemble a two-piece scroll member into a rigid construction without the need for screws and for providing precisely aligned threaded holes through the end plate and into the wrap surface. It is still another object to provide a method of scroll member fabrication which permits a wide choice in materials and allows the end plate and involute wrap to be formed of different materials.

It is another primary object of this invention to provide an improved, rigidly assembled two-piece scroll member. It is another object to provide scroll members of the character described which can be formed of a wide range of materials, the involute wrap and end plate being, if desired, of different materials.

Other objects of the invention will in part be obvious and will in part be apparent hereinafter.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

According to one aspect of this invention, there is provided a method of fabricating a scroll member having an involute wrap rigidly affixed to an end plate, comprising the steps of forming in the surface of an end plate an involutely configured channel; forming a reentrant groove in one side wall of the channel along its length; providing an involute wrap sized and configured to seat in the channel and having a surface configured to at least partially engage the reentrant groove along its length, seating the wrap into the channel thereby to define a locking space between the flank of the wrap and the other side wall of the channel; and locking the wrap in the channel into fixed engagement with the end plate.

According to another aspect of this invention there is provided a scroll member for incorporation in scroll apparatus comprising, in combination, a separate end plate having formed in the surface thereof an involutely configured channel having a reentrant groove along the length of one of its side walls; an involute wrap seated in the channel and having a surface configured to at least partially engage the reentrant groove; and locking means forcing the wrap into fixed engagement with the reentrant groove and rigidly attaching the involute to the end plate. For a fuller understanding of the nature and objects of the invention, reference should be had to the following detailed description taken in connection with the accompanying drawings in which FIG. 1 is a top planar view of a typical scroll member;

FIGS. 8–10 illustrate in cross section the locking in of the involute wrap into the channel of FIG. 6;

FIG. 11 shows in cross section another embodiment of the end plate channel;

FIGS. 12 and 13 illustrate the locking in of the involute wrap into the channel of FIG. 11;

FIG. 14 illustrates yet another embodiment of channel configuration;

Figure 1:
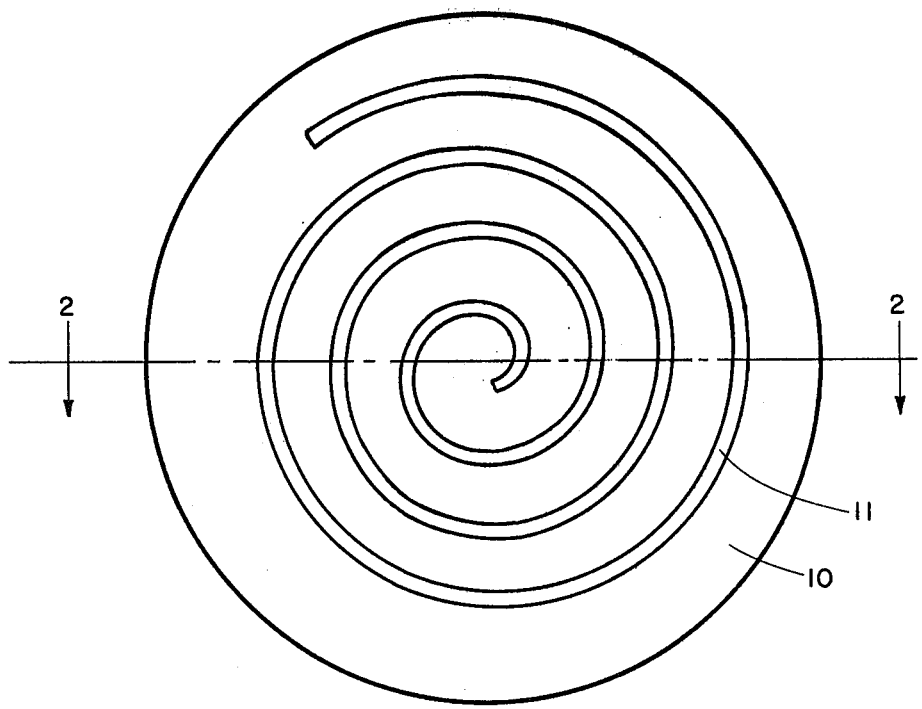
Figure 2:
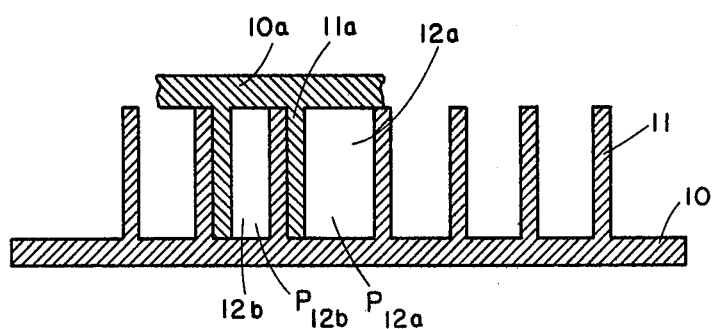
FIG. 2 is a cross section of the scroll member of FIG. 1 through plane 2—2 of FIG. 1.

FIGS. 1 and 2 illustrate the basic design of a typical scroll member suitable for use in any of the scroll apparatus described in the previously listed United States Patents. It will be appreciated that such features as shafts, ports, peripheral walls and the like are not shown since these may vary as required and are not part of the present invention. The basic construction of any scroll member comprises an end plate 10 and an involute wrap 11 affixed thereto. The wrap is hereinafter for convenience referred to as being "involute," i.e., configured as an involute of a circle. However, it is to be understood that the wraps may have, for example, the configuration of an arc of a circle or any other suitable shape. As detailed in the United States Patents previously listed, a scroll apparatus is made up of complementary scroll members having facing end plates with angularly and radially offset involute wraps of like pitch. The orbiting of one of these scroll members angularly and radially offset from the other defines fluid pockets which in the case of a compressor or expander decrease in pressure radially outward from the machine axis. Thus, as illustrated in partial cross section in FIG. 2, the contacting of wrap flanks 11a, affixed to complementary end plate 10a define fluid pockets 12a and 12b in which $P_{12a} > P_{12b}$. As will be shown below, the existence of this pressure differential across the involute wrap has a bearing on the fabrication of scroll members in accordance with this invention.

Figure 3:
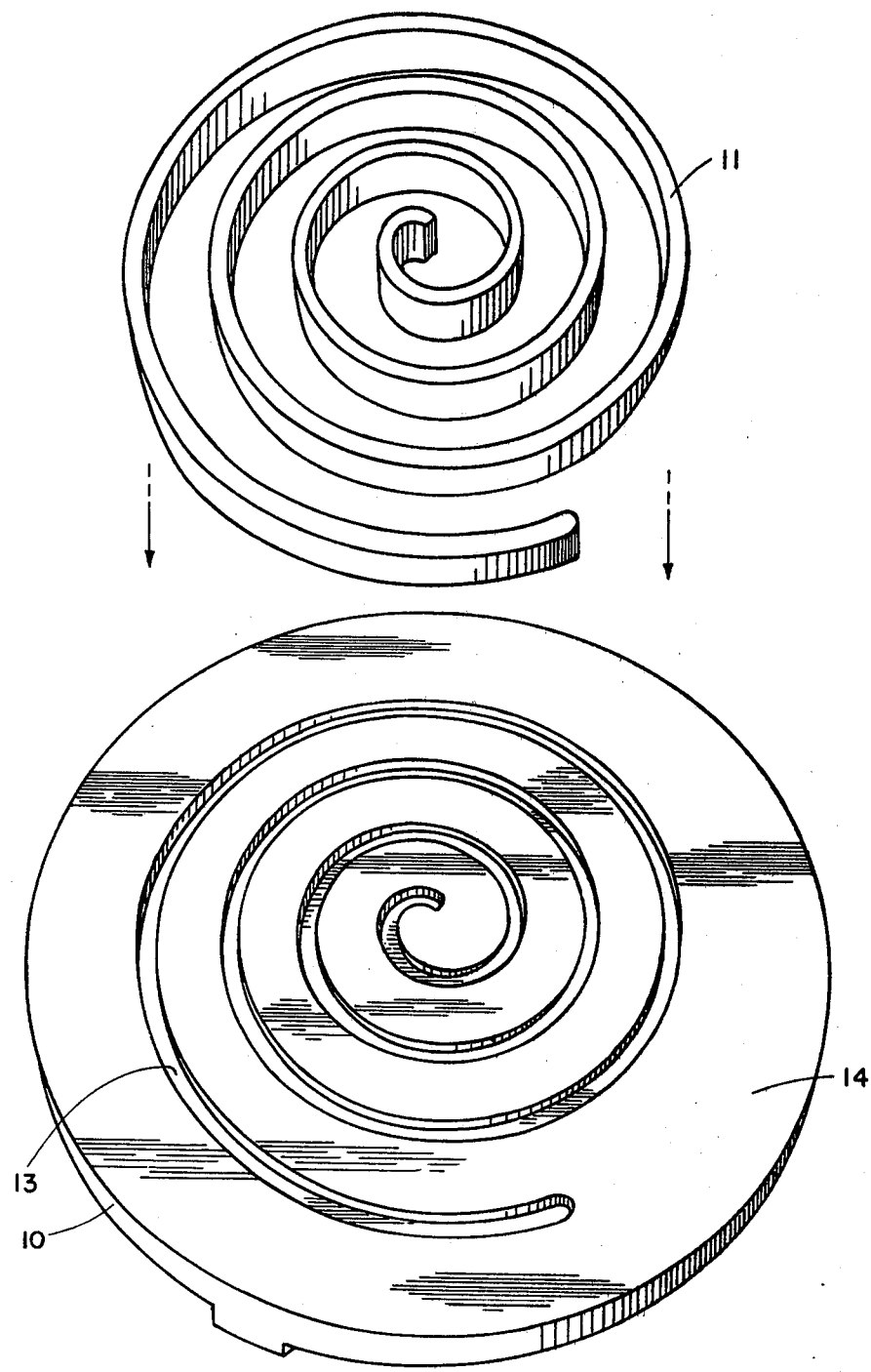
FIG. 3 is a perspective view of an end plate and an involute wrap, showing the general fabrication method.

FIG. 3 illustrates the general fabrication of a scroll member according to this invention just prior to assembly. The end plate 10 has an involute channel generally indicated by the reference numeral 13 and configured according to this invention, formed in that surface 14 which will face a complementary scroll member in a scroll apparatus. The wrap 11, as a separate member, is configured to correspond to channel 13, and is conveniently fabricated by casting, molding or otherwise forming it into the required involute configuration. A preferred way is to form a strip of material and roll form it. When wrap 11 is seated and locked into channel 13, a scroll member is formed.

Although in most instances it will be desirable to form the separate end plate and wrap of a scroll member constructed in accordance with this invention of the same material, this is not necessary. In some cases it may be preferable to use different materials even to the extent that metallic and nonmetallic materials are used in the same scroll member.

Figure 4:
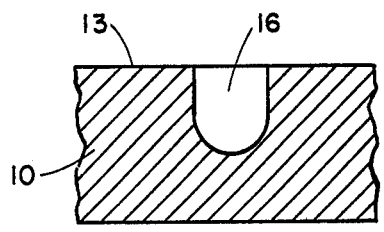
FIGS. 4–6 illustrate in cross section, the steps which may be used to form one embodiment of the involute channel in the end plate.
Figure 5:
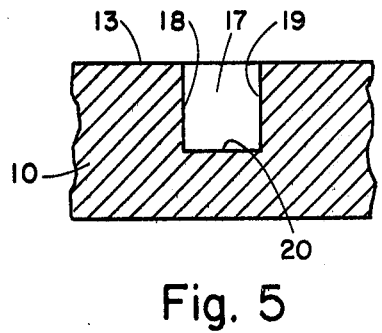
Figure 6:
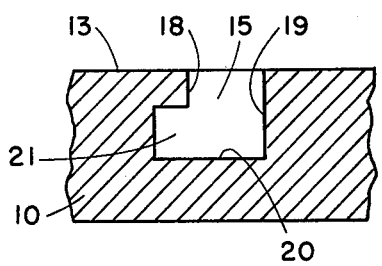

According to this invention the channel in the end plate surface has at least one reentrant groove formed along the length of at least one side wall. One embodiment of such a channel 15 is illustrated in FIG. 6. FIGS. 4–6 illustrate a preferred method for forming such a channel. The end plate 10 is formed, e.g., cast, to have a roughly formed channel 16 (Fig. 4) of the required involute configuration in surface 13. Subsequently, rough channel 16 is cleaned out to form a channel 17 (Fig. 5) of rectangular configuration having sides 18 and 19 and bottom 20. This step may be done by milling, by a turning operation or any other suitable technique. The final step in forming channel 15 is the forming of a reentrant groove 21 in side 18 of channel 17. This may be done using a milling, fly-cutting or turning operation.

Figure 7:
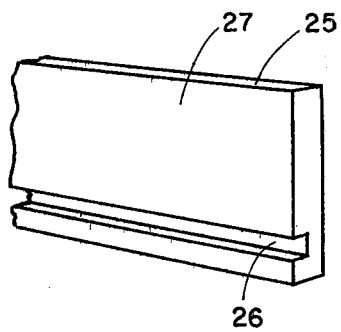
FIG. 7 is a perspective view of a portion of a blank for forming the involute wrap.

Although the separate involute wrap member may be cast in its desired configuration and then grooved to provide the necessary reentrant groove-engaging surface, it is preferable to start with a straight blank strip 25 (Fig. 7) which can be roll formed, or otherwise forced, into the desired involute configuration. If the wrap is to be formed in this preferred manner, then it must, of course, be of a material having sufficient ductility to allow such forming. As seen in FIG. 7, a groove 26 is milled or otherwise formed in that surface 27 which is to engage the reentrant groove 21. Groove 26 is preferably formed in the surface of that wrap flank which, when formed into the involute, will be exposed to the lesser pressure in an operating scroll apparatus.

Figure 8:
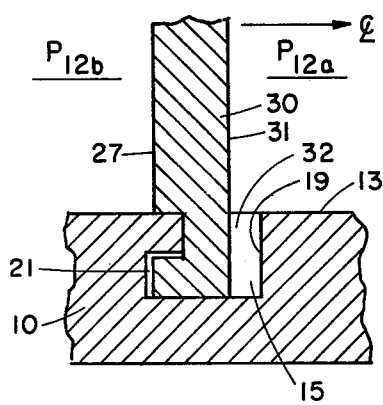

After the grooved blank 25 is shaped into involute wrap 30 it is seated in channel 15 (FIG. 8) and positioned such that it engages at least a portion of the surface of reentrant groove 21 sufficient to provide a sealing contact (FIG. 8). There is, thereby, defined between that wrap flank 31, exposed to the higher pressure, and channel wall 19 a lock spacing 32 following the contour of the involute channel. Since wrap 30 is sealed to end plate 10 through reentrant groove 21 and the wrap surface engaging it, it is preferable that the radial forces brought about by reason of the pressure differential across the wrap be used to reinforce the locking means to be inserted into channel. This then means that it is preferable that flank 31 of the wrap which defines locking space 32 face the centerline of the machine.

Figure 9:
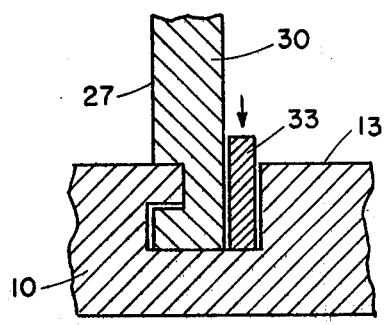

Into spacing 32 is fitted a locking strip 33 which makes a loose fit therewith and which has a height greater than spacing 32 (FIG. 9). Locking strip 33 must be formed of a material which has sufficient flexibility to permit it to be wound into the involute space and sufficient ductility to allow it to be cold formed or coined, upon application of force (indicated by the arrow), to cause it to be tightly wedged into spacing 32 to rigidly lock wrap 30 into channel 15. As seen in FIG. 10, the volume of locking strip 33 should be chosen such that the coined lock 34 will be flush with surface 13 of end plate 10 or rise slightly above it, in which case it is necessary to finish off the surface of coined lock 45 such as by turning or any other suitable technique. Aluminum with the required degree of flexibility and ductility is an example of a suitable locking strip material. The force required to effect this cold forming or coining of the locking strip may be applied by such means as a hydraulic press equipped with suitable dies for supporting the end plate 10 and contacting the protruding surface of locking strip 33.

FIGS. 11-13 illustrate another embodiment of the end plate channel and of the manner of locking the involute wrap in it. Channel 40 will be seen to have opposed reentrant grooves 41 and 42 on sides 18 and 19. This channel is initially formed as shown in FIGS. 4 and 5. These reentrant grooves 41 and 42 can be formed in one operation by using a milling cutter and beginning at the outboard end of the channel with the milling of an enlarged groove which permits the insertion of the milling cutter. After sealing the involute 30 into channel 40, a locking strip 43 is inserted into locking space 44 which includes reentrant groove 42. (FIG. 12). Locking strip 43 is tapered to permit the strip material to flow around into reentrant groove 42 during the coining step (FIG. 13). The resulting coined lock 45 is, like the wrap 30, locked into the end plate, thus strengthening the bond between wrap and end plate.

Figure 15:
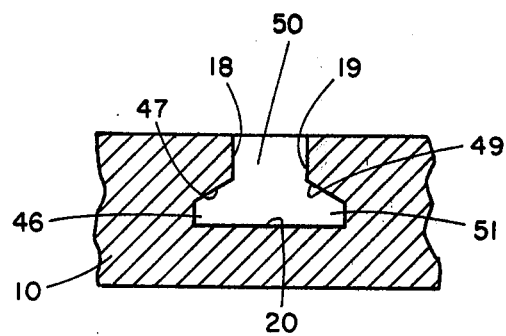
FIG. 15 shows in cross section yet another embodiment of the end plate channel.
Figures 16, 17:
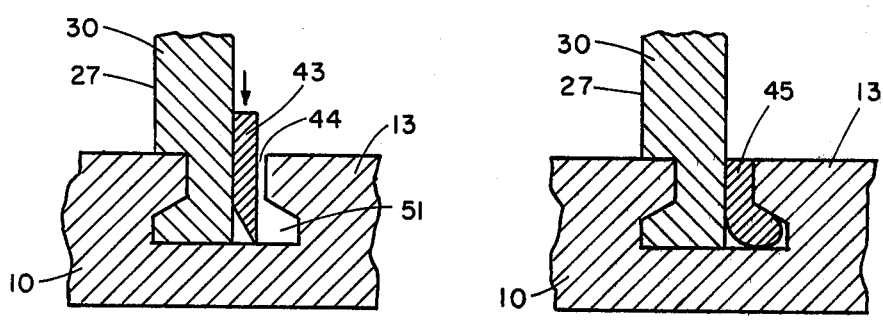
FIGS. 16 and 17 illustrate the locking in the involute wrap into the channel of FIG. 15.

FIG. 14 illustrates yet another embodiment of this invention. In this arrangement, reentrant groove 46 has one inclined surface 47 to give it a trapezoidal cross sectional configuration and groove 48 in wrap surface 27 is configured to at least partially engage groove 46. Assembly and locking is achieved as described for the embodiment of FIGS. 8-10. It is also, of course, within the scope of this invention to form a channel with opposed reentrant grooves configured as in FIG. 15 and used as in FIGS. 16 and 17.

Although it will normally be required to form the elements of the scroll member of this invention from metals, it is also possible to use those synthetic plastics which can be fabricated, formed and machined as required by the method of this invention.

The method of this invention makes possible the construction of two-piece scroll members using techniques and equipment which are best adapted for large scale production at reasonable cost. The resulting unique scroll members are suitable for incorporating in a wide range of scroll apparatus.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

I claim:

1. A method of fabricating a scroll member having an involute wrap rigidly affixed to an end plate, comprising the steps of:
    (a) forming in the surface of an end plate an involutely configured channel;
    (b) forming a reentrant groove in one side wall of said channel along its length;
    (c) providing an involute wrap sized and configured to seat in said channel and having a surface configured to at least partially engage said reentrant groove along its length;
    (d) seating said wrap into said channel thereby to define a locking space between the flank of said wrap and the other side wall of said channel; and
    (e) locking said wrap in said channel into fixed engagement with said end plate wherein said locking comprises the steps of inserting a locking strip formed of material which has sufficient flexibility to permit it to be wound into said locking space and sufficient ductility to allow it to be coined into said locking space and coining said locking strip thereby to wedge said wrap into said channel.

2. A method in accordance with claim 1 wherein said end plate is precision cast and said forming of said channel comprises forming a rough channel during casting followed by machining to form said channel with a rectangular cross sectional configuration.

3. A method in accordance with claim 1 wherein said reentrant groove is formed to have a rectangular cross sectional configuration.

4. A method in accordance with claim 3 including the step of forming an opposing reentrant groove in the other side wall of said channel.

5. A method in accordance with claim 1 wherein said reentrant groove is formed to have a trapezoidal cross sectional configuration.

6. A method in accordance with claim 5 including the step of forming an opposing reentrant groove in the other side wall of said channel.

7. A method in accordance with claim 1 wherein said step of providing said involute wrap comprises cutting a groove along the length of an involute blank to develop said surface in said wrap and forming said blank into the required involute configuration.

8. A method in accordance with claim 1 wherein said flank of said wrap defining said locking space is the flank of said involute which faces the center line of the scroll apparatus in which said scroll member is used.

9. A scroll member, comprising in combination
(a) a separate end plate having formed in the surface thereof an involutely configured channel having a reentrant groove along the length of one of its side walls;
(b) an involute wrap seated in said channel and having a surface configured to at least partially engage said reentrant groove; and
(c) locking means forcing said wrap into fixed engagement with said reentrant groove and rigidly attaching said involute wrap to said end plate wherein said locking means comprises in combination a locking strip formed of material which has sufficient flexibility to permit it to be wound into a locking space and sufficient ductility to allow it to be coined, said locking space defined between the flank of said wrap and the other side wall of said channel when said wrap is seated in said channel.

10. A scroll member in accordance with claim 9 wherein said reentrant groove has a rectangular cross sectional configuration.

11. A scroll member in accordance with claim 10 wherein said channel has an opposing reentrant groove in the other side wall of said channel.

12. A scroll member in accordance with claim 9 wherein said reentrant groove has a trapezoidal cross sectional configuration.

13. A scroll member in accordance with claim 12 wherein said channel has an opposing reentrant groove in the other side wall of said channel.

14. A scroll member in accordance with claim 10 wherein said locking strip material is aluminum.

15. A scroll member in accordance with claim 10 wherein said flank of said wrap defining said locking space is the flank of said involute which faces the center line of the scroll apparatus in which said scroll member is used.

* * * * *